April 17, 1956  G. L. MELLEN  2,742,246
BALLOON ALTITUDE CONTROL
Filed Dec. 8, 1952
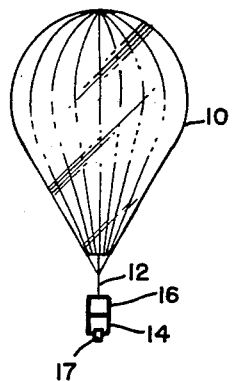
FIG. 1
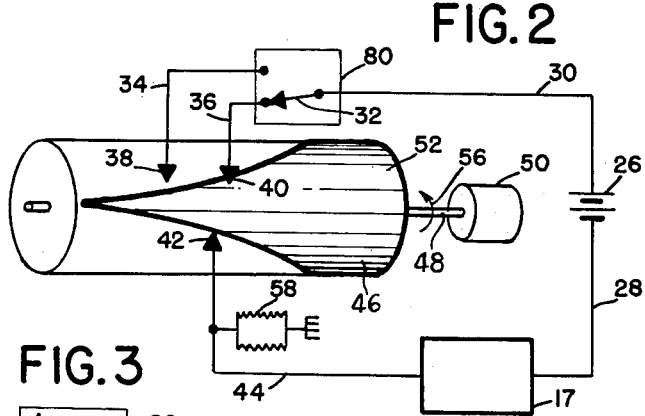
FIG. 2
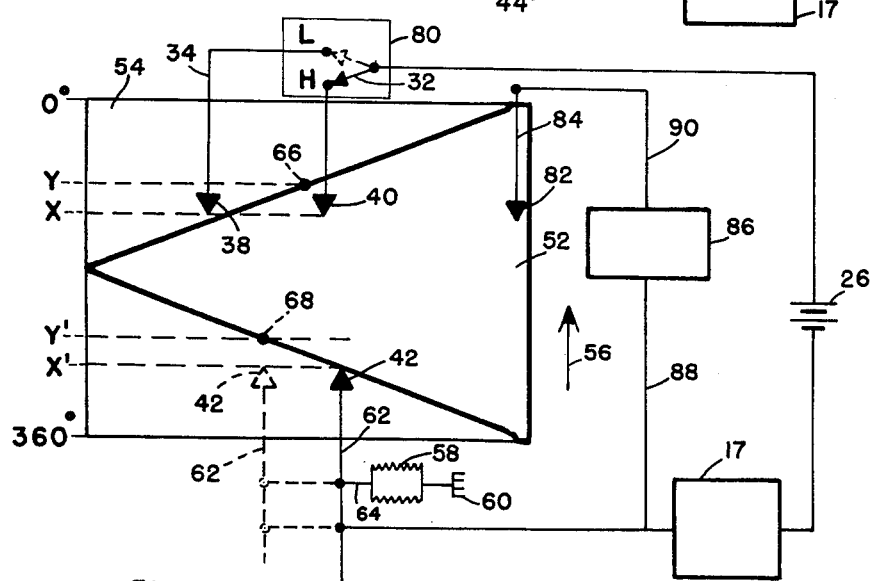
FIG. 3
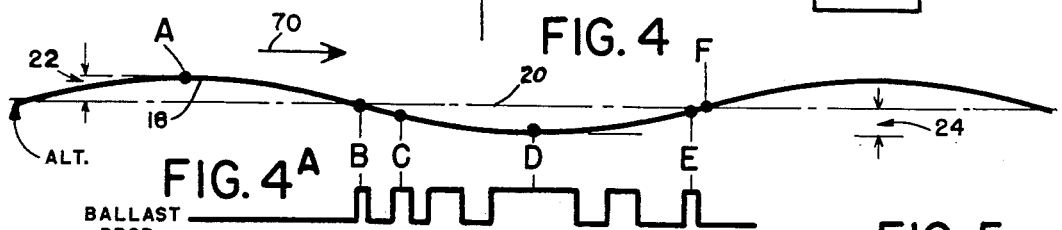
FIG. 4
FIG. 4A
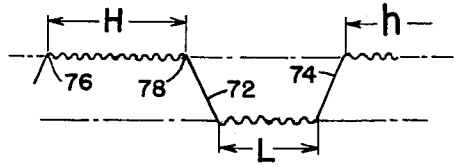
FIG. 6
FIG. 5
INVENTOR
GLENN L. MELLEN
BY William C. Stueber ATTORNEY United States Patent Office 2,742,246
Patented Apr. 17, 1956

2,742,246

BALLOON ALTITUDE CONTROL

Glenn L. Mellen, Framingham, Mass., assignor to General Mills, Inc., a corporation of Delaware Application December 8, 1952, Serial No. 324,761

18 Claims. (Cl. 244—94)

This invention relates to an improved apparatus and method for controlling the altitude of a balloon and especially for keeping the balloon at a constant altitude.

In sending a balloon aloft for various purposes, such as recording atmospheric conditions over a period of time, it is often desirable that the balloon maintain a constant altitude with as little variation as possible. The balloon is kept at constant altitude by employing various methods and devices which serve to increase or decrease the gross lift of the balloon. This end may be accomplished by known general expedients, such as by adding or discharging lifting gas or by discharging ballast. Thus, as the free lift is changed to compensate for change in conditions, the balloon will oscillate about an ideal altitude. Some of these changes in conditions which, when uncompensated, cause the balloon to change altitude, are loss of lifting gas due to diffusion, change of volume of gas from changes in temperature, etc.

In a balloon which does not carry an operator, attempts to control the altitude generally include mechanical devices which should be automatic in operation. It is often desirable that an automatic altitude control function to keep the variance of the balloon from the chosen altitude as small as possible.

If, for example, the balloon drops below the desired altitude due to loss of gas, and compensation is made by increasing free lift such as by discharge of ballast until the balloon returns to the desired altitude, the balloon will normally continue ascending past the desired altitude a considerable distance. Since the balloon does not respond immediately to the dropping of ballast more ballast is dropped than is necessary to get the balloon back at the proper altitude. Then gas will have to be lost by the balloon before it will descend to the correct altitude and as it descends it will generally go below the chosen altitude a distance before ballast is again dropped in proper amounts to return it to the chosen altitude. Thus, if the altitude control is accomplished solely by a uniform increase in free lift when the balloon descends below the desired altitude, the resultant path of flight will oscillate greatly.

Also, if ballast is dropped continually until the proper altitude is reached, large amounts of ballast will be necessary and the maximum attainable time of flight and attainable altitude for the balloon will be greatly decreased.

Accordingly, it is an object of the invention to provide an altitude control of a balloon which will serve the above and other objects and which will accurately control the altitude of a balloon permitting flying a balloon at a constant altitude with a minimum amount of oscillation about the desired altitude of flight.

In balloon flights it would often be advantageous to be able to fly the same balloon at different altitudes. The altitude at which the balloon maintains flight should be selectable at will either before the balloon is sent aloft or by remote control after the balloon is in flight. Frequently, one balloon would serve where two are now needed.

Therefore, a further object of the invention is to provide a balloon altitude control which will cause the balloon to remain at a constant altitude by controlling its free lift and which may be remotely controlled to change the flight altitude of the balloon from one level to another level.

Another object of the invention is to provide a device which will control the altitude of the balloon by dropping ballast intermittently and which will decrease the rate at which the ballast is dropped as the balloon nears the desired flying altitude to save ballast and minimize overshooting.

A still further object of the invention is to provide a balloon altitude control device which will permit recording the flight altitude of the balloon at a remote location.

Other objects and advantages will become apparent from the description of the invention as disclosed in the specification taken in connection with the accompanying drawings, in which Figure 1 is an elevation of a balloon carrying the balloon altitude control apparatus and ballast;

Fig. 2 is a diagrammatic view illustrating mechanism embodying the features of the present invention;

Fig. 3 is a schematic view of the mechanism embodying the invention with the cylinder carrying the conducting material shown as a flat surface to better illustrate its form and operation;

Figs. 4 and 4a show a chart illustrating the path of flight of the balloon and the corresponding rate of discharge of ballast;

Fig. 5 is a graph illustrating the path of flight of the balloon when the change-of-altitude control is used; and Fig. 6 is a schematic view illustrating a simplified and modified embodiment of the invention.

The balloon altitude control device embodying the features of the present invention operates principally to maintain a balloon at a very constant altitude, accomplishing this by varying the amount of ballast discharge in proportion to the distance the balloon is from the desired altitude. Thus, when the balloon is only a small distance below the proper altitude, small amounts of ballast are dropped and, as the deviation becomes greater, larger amounts are dropped to increase the corrective effect of the lessened weight. This improves the performance of the balloon, reducing the distance it will descend below the desired altitude. It also reduces the amount of ballast which must be carried, thus giving the balloon a higher attainable flight.

The altitude control device also permits selecting the altitude at which the balloon is to fly by setting the minimum altitude the balloon may reach at which ballast will begin dropping. These and other features will be most easily followed when explained in connection with the illustrated embodiment of the invention.

The arrangement of the control apparatus on a balloon is illustrated generally in Fig. 1, with a balloon 10 filled with a lifting gas. At the lower end of the balloon, supported by a load line 12, is a suitable rigging carrying ballast 14 and carrying the altitude control mechanism 16. The ballast may be in solid or liquid form and, for purposes of the present illustration, will be described as liquid with its discharge being controlled by an outlet valve 17 (not shown in detail) at the bottom of the container 14. The liquid may be kerosene, which is non-freezable at the temperatures encountered, or may be of other various types known to the art.

In the present embodiment, the free lift of the balloon is altered by dropping ballast. Change in gross lift and change in gross weight of the balloon are used interchangeably in the present application to have substantially the same meaning as indicating an intrinsic change in the character of the balloon or load which will cause it to ascend or descend. Thus the present mechanism causes the balloon to change altitude by discharging or not discharging ballast and could be adapted to create the same effect by discharging gas to atmosphere, increasing volume of the balloon, or other means. A ballast control is to be desired because of better obtainable control and a conservation of lifting gas.

When the balloon is released at ground level, the excess lifting gas which has been inflated into the balloon carries the balloon, the altitude control apparatus and ballast indicated at 14, and the load shown at 16 aloft. Equilibrium is reached at the point where the lift of the gas equals the total weight of the balloon and load. At this point the balloon envelope has usually become fully extended and the excess lifting gas has been forced out. In addition to the load shown, additional payload may be carried, such as instruments used for testing and recording atmospheric conditions.

The point at which the balloon reaches equilibrium and stops its ascension is usually the desired altitude at which it is to be flown as was predetermined by the design and the size of the balloon and amount of weight carried.

As time passes, gas will be lost by diffusion through the balloon material decreasing its lift causing it to descend. In order to cause it to ascend and return to the proper altitude, ballast will have to be discharged. The discharge of ballast will decrease the gross weight of the balloon and cause it to begin to ascend. Since the balloon in descending has inertia and since the beginning of ballast discharge does not fully compensate for the balloon's loss of lift, there is some lag between the beginning of ballast discharge and the beginning of the ascent of the balloon. The balloon will therefore continue descent past the point where the discharge is begun after ballast is dropped. In the same manner, because of inertia and other factors, once the balloon has begun to ascend it will continue to ascend even after the discharge of ballast is ceased. Thus, it is virtually impossible to keep the balloon at an absolutely constant altitude and its path of flight 18 will oscillate about a line 20 representing the constant altitude, as is shown by the diagram of Fig. 4. The present invention keeps the deviation distance, represented by distances 22 and 24, at a minimum.

To discharge the liquid ballast, the control valve 17 is designed to be opened when placed in the circuit with a source of electricity shown at 26 in Fig. 2. The ballast control valve may be a solenoid valve or other suitable type and the source of electricity is a set of batteries suitable for carrying aloft with a balloon. To complete the circuit between the batteries and the control valve, a lead 28 connects from one post of the batteries to the control valve and a lead 30 connects from the other post of the batteries to a switch 32. The switch 32 selectively places the lead 30 in circuit with either lead 34 or lead 36. These latter leads, through brushes 38 or 40 respectively, complete the circuit through conducting area 52 and brush 42 to lead 44 which connects to the other side of the ballast control valve.

The brushes 38, 40 and 42 bear upon the surface of a commutator cylinder 46 mounted for rotation upon a shaft 48. The cylinder is given suitable rotation by a motor 50 which may be electrically energized or spring-wound. The cylinder is turned at a constant relatively slow speed to intermittently complete the circuit between the brushes.

The cylinder is constructed of an insulating material and carries on its surface an area of conducting material, indicated by the shaded region 52. The conducting area on the surface is, generally speaking, triangular in shape, and extends completely around the cylinder at the right-hand side, and tapers to a narrow point at the lefthand side of the cylinder. For illustrating this, Fig. 3 shows the surface of the cylinder laid out in a flat plane with the conducting area at 52 and the non-conducting area at 54. The arrow 56 indicates the direction of rotation of the cylinder surface.

As may be seen, the circuit is completed between brushes 40 and 42 or between brushes 38 and 42 when the two brushes simultaneously bear on the conducting material 52. Thus, when the switch 32 is in the solid line position of Fig. 3 and the commutator cylinder is in the position shown, circuit is made between brushes 40 and 42 and the circuit is completed between the batteries 26 and the ballast control valve 17, opening the ballast valve. For intermittent discharge of ballast, circuit is made only for the period of rotation while brush 40 moves from the point indicated by the dotted line Y to the position indicated by the dotted line X. At the latter position brush 42 is at the position indicated at X' and rides off the conducting area 52 on to the non-conducting area 54, breaking the circuit and closing the ballast control valve. Thus, for each rotation of the cylinder, the ballast control valve will be open for that period of time while the brush 40 moves from the position Y to position X. This causes an intermittent dropping of ballast. The passage of time between the intermittent release permits the reduction in gross weight to have its effect felt on the balloon before additional ballast is dropped. This also prevents an overdropping of ballast in case the balloon should respond fairly rapidly and move back up to the desired altitude before the commutator cylinder revolves another revolution.

As the balloon moves back up to the desired altitude from the reduction in weight by loss of ballast, the brush 42 will move gradually to the left to the dotted line position shown in Fig. 3. The position of brush 42 is controlled by a pressure responsive device 58, shown in the form of an aneroid bellow. The aneroid control 58 is fixedly mounted at 60 with respect to the rest of the mechanism and has its movable end connected to the arm 62 by a rod 64. The arm 62 supporting the brush 42 is suitably mounted at a point not shown to reciprocate with the expansion or contraction control 58 so as to move the brush 42 substantially axially along the commutator cylinder.

As the balloon moves from a position below the desired altitude to the desired altitude, the aneroid control 58 will expand, carrying the brush 42 to the dotted line position shown in Fig. 3. When at that point, the circuit will not be completed between brushes 40 and 42 no matter what the position of the commutator cylinder. For example, as the commutator cylinder rotates, the brush 40 will enter upon the conducting surface at the point 66 where the line Y intersects the edge of the conducting segment. At the same moment, the brush 42 will be leaving the conducting segment at point 68 where line Y' intersects the edge of the conducting area so the circuit between the brushes can't be made. Summarizing the above, it will be seen that when the balloon has ascended to the desired altitude, brush 42 will have moved to a position where a circuit is no longer completed to the ballast control valve and the valve will not open and thus discharge of ballast will have stopped.

Referring to Fig. 4 and the path of the balloon 18, the balloon is shown traveling to the right, as indicated by the arrow 70. As the balloon rises after being released from the ground, it reaches the point labeled "A," where the weight and lift are in equilibrium. At this point the balloon stops its ascent. Actually equilibrium is not reached because the balloon will travel a little higher because of the inertia gathered in the rise. Diffusion of gas through the balloon walls will decrease the lift of the balloon, causing it to descend. When it reaches point B the aneroid control 58 draws the arm 62 carrying brush 42 to the right past the dotted line position shown in Fig. 3. As cylinder 46 rotates, the conducting area 52 is carried beneath the brushes and the circuit will be briefly completed through the ballast control valve. The ballast relief valve will be briefly opened to discharge a small amount of ballast, thus slowing down the descent of the balloon.

The amount of ballast discharge is represented on the graph of Fig. 4A, which is vertically aligned with the path of the balloon. The rises on the graph indicate the periods of time during which the circuit is completed through the ballast control valve. The length of the horizontal lines of the rises is proportional to the time the circuit is completed and, consequently proportional the amount of ballast discharged. By the time the cylinder is rotated another revolution, the balloon will have descended to the point indicated at C. The decrease in altitude will cause the aneroid control 58 to move the brush 42 farther to the right so that the circuit between 40 and 42 is completed for a longer period of time. This longer period of contact and the increase in ballast dropped is indicated on the graph of Fig. 4A. The effect of the first drop in ballast at B has already been noted on the balloon and its rate of descent has decreased as noted by the curve 18 which resembles a sine curve, the slope of the curve at C being less than at B, indicating a decrease in rate of descent. The balloon continues to descend, partially because of its inertia, until it reaches point D, where the descent flattens out and the balloon reverses direction and begins climbing. At point D the brush 42 is in the solid line position of Fig. 3 and the circuit to the ballast control valve is completed for the longest period of time with the largest discharge of ballast shown in Fig. 4A. The ascent of the balloon, due to its decreased gross weight from discharge of ballast, continues ascending and the rate of ballast discharge is now decreasing. Since the balloon is approaching the desired altitude, discharge of ballast at a heavy rate is unnecessary and merely wastes ballast. With the rate of discharge decreasing, only sufficient ballast is dropped to continue the balloon on its upward trend and, as the balloon reaches point E just before the desired altitude, the amount of ballast dropped has reached a minimum. At point F the discharge is terminated. Due to inertia and the effect of over-drop of ballast, the balloon will continue on past the desired altitude by a small amount.

With the method of increasing the rate of ballast discharge until the balloon stops falling and begins to ascend, and the method of decreasing the rate of discharge until the balloon reaches the proper altitude, its path of flight will form a shallow curve beneath the line of desired altitude. The balloon will continue to rise because of inertia for a short time after it has moved above the chosen altitude and the ballast discharge has stopped.

The path of flight of the balloon when below the proper altitude can be altered by changing the width and the shape of the conducting area on the commutator cylinder. By widening the conducting area toward the right by moving the trailing edge downwardly from the point 68 the amount of ballast dropped will increase at a much greater rate as the balloon drops and the effect will be to shorten the distance between B and F of the curve and flatten it. Conversely, narrowing the conducting area to the right of the point 68 will cause the increase in rate of ballast drop, as the balloon moves from point B to D, to be much smaller and thus lengthen the distance between points B and F and increase the curvature of flight.

The invention further makes it possible to change the altitude of flight at will, enabling the balloon to be flown at different constant altitudes. The change in flight altitude can be done while the balloon is in flight and the change made in response to a remote signal from the ground or made in response to change of flight conditions or it also can be made after the passage of time. The necessity for a balloon which will have constant flight altitude and which can be flown at various altitudes arises with the need for recording atmospheric data for a period of time at various levels. The ability to change the altitude of flight of a balloon could also be useful where it is desirable to either obscure the balloon from sight or to bring it into visibility by changing its altitude with respect to cloud formations, etc. A still further advantage can be found in a balloon capable of multiple levels of flight, where the balloon is to be kept flying at its maximum altitude without spilling its lifting gas from expansion of the gas due to heat.

Referring to Fig. 5, the distance H indicates path of flight of the balloon at high altitude. The distance L indicates its path of flight after the balloon has descended to a lower altitude along path 72, and $h$ indicates the balloon's flights after it has returned to high altitude along path 74.

If, for example, the balloon is sent aloft during the daytime, when it reaches its maximum altitude at point 76, the gas will be warm from the rays of the sun and expanded. At nightfall when the balloon reaches point 78 the gas will contract due to cooling, and the balloon losing lift will descend along the path 72. With the present apparatus the tendency of the balloon to descend would normally be compensated for by the automatic ballast discharge mechanism, thus wasting quantities of ballast. To conserve this ballast and permit the balloon to fly at the lower night level of flight, the automatic control device is switched to the circuit which will cause the ballast to begin discharging at a much lower level and keeping the balloon in that lower level of flight. When daytime again arrives the gas again expands taking the balloon to altitude $h$ along path 74.

To switch the altitude control system from the high to the low level flight position, the switch 32 is moved from the solid to the dotted line position of Fig. 3, thus disconnecting brush 40 from the circuit and placing brush 38 with its lead 34 in circuit with the battery 26. With the switch in this position, the two brushes 38 and 42 both must be on the conducting area 52 simultaneously before the circuit will be completed through the ballast control valve. This will be the situation only when the arm carrying the brush 42 has moved further to the right than is shown in the solid line position of Fig. 3. From the drawing it will be seen that brush 42 leaves the conducting area just as brush 38 enters it. Brush 42 will move right when the aneroid control 58 has contracted by being carried to a lower altitude. Thus, when the switch 32 is moved to the L position, the balloon will continue its descent until brush 42 is carried far enough to the right so that brushes 38 and 42 will both bear on the conducting area of the commutator cylinder at the same time. This will occur when the ballon is at altitude L. The brushes will then function the same as brushes 40 and 42, as recited in the previous description, maintaining the balloon at the constant altitude L.

The switch 32 may be any suitable relay switch which is carried in the container 80 along with the switch actuating gear. The switch actuating gear may be in the form of a radio receiver acting upon an impulse on the ground to determine the position of the switch. The switch 32 may instead be actuated by condition responsive means, responsive to light and operating to switch to the lower altitude switch position in the event of darkness. The switch may be designed to be temperature responsive, switching the switch to the lower altitude position in response to the cooling of the air. It will be recognized that other devices may be used for the control of switch 32.

Further utilization of the principles of the present invention may be made in the provision of a mechanism for transmitting the altitude of the balloon to a remote receiver where it may be recorded by a listener on the ground. This may be accomplished by measuring the duration of time which the brush 42 rests on the conducting area 52 of the commutator cylinder. Since the position of the brush 42 is determined by the altitude of the balloon, and the length of time the brush spends on the conducting area is proportional to its axial location with respect to the conducting area, its duration of time of contact is inversely proportional to its altitude.

A brush 82 is suspended on an arm 84 to engage the contacting surface for its full period of rotation. A transmitter 86 is provided which transmits signals to a receiver when a circuit is completed between the leads 88 and 90, which are respectively connected to brushes 42 and 82. Therefore, during the time brush 42 is on the conducting area, the circuit is completed through the transmitter 86 and a signal is being transmitted to the ground. Measurement of the duration of that signal will indicate the altitude of the balloon at the time of signal.

In Fig. 6 is illustrated a modification of the device which may be used for simple operation where it is not necessary to fly the balloon at different altitudes. In this embodiment, the altitude at which the balloon is to fly is determined before the balloon is sent aloft by the setting of the aneroid bellows 92. This aneroid control is similar to the one shown in Figs. 2 and 3 and is secured to a mounting 94 fixed with respect to the rest of the mechanism. The movable end has a push rod 96 which connects to an arm 98 which carries a brush 100 and which is suitably mounted so as to be freely movable in an axial direction along the surface of the cylinder 102. The cylinder 102 has a conducting area 104 and a non-conducting area 106 the areas being laid out on a flat plane so that the V shape of the area may be observed.

A second brush 108 bears against the surface of the cylinder and is in continual contact with the conducting material 104. A ballast release valve 110 is provided and suitable leads are connected to complete a circuit from the brushes through battery 112 and ballast control valve. As the cylinder rotates, the brush 100 will intermittently contact the conducting area 104, completing the circuit between brushes 108 and 100 to cause operation of the ballast discharge valve. With the discharge of ballast and the decrease of the gross weight of the balloon it will ascend. When the balloon reaches the proper altitude the reduced atmospheric pressure will cause aneroid control 92 to carry the arm 98 to the dotted line position shown in Fig. 6. At that position, as the cylinder rotates, the brush will not contact the conducting area and the discharge of ballast will not occur. Not until the balloon again drops below the desired altitude will the brush move to the right to engage the conducting area 104 and begin the discharge of ballast.

It will be seen that with this simplified modification of Fig. 6 the ballast will be dropped at an increasing rate as the distance of the balloon from the desired altitude increases. Also, the rate of ballast discharge will decrease as the balloon rises and approaches the desired altitude. The rate of decrease or increase of ballast discharge is controlled by the shape of the conducting area 104. If the conducting area narrows very swiftly from the broad area indicated at 114 to the narrow area indicated at 116, the decrease of rate of discharge will be high. If the width of the area 114 decreases very gently to the width 116, the decrease of rate of discharge will be small.

Thus it will be seen that I have provided a balloon altitude control which can be used to accurately control the altitude of flight of the balloon and with very sensitive control elements the flight can be kept to an almost flat horizontal path. The device also enables flying the balloon at various altitudes which are selectable at will. It will be seen that any number of brushes similar to 38 and 40 may be provided with each brush representing a different altitude of flight. The switch 32 will then be arranged to have a contact for each brush and the altitude of flight will be chosen by setting the switch to the contact representing the desired altitude.

Various other arrangements can be provided to obtain the balloon performance desired. For very swift ascent of the balloon the brushes and conducting area could be arranged to yield a continuous discharge of ballast until the balloon reaches the proper altitude. As will be apparent to those skilled in the art, from the teachings of the present invention these effects may be obtained by variance in the design of the shape of the conducting area 52 and the positioning of brushes similar to the ones shown.

Principally, the present invention has taught a device and method which enables attaining a very level path of flight with the utilization of small amounts of ballast and with a minimum of equipment. This permits sending a balloon aloft with very small weights of operating mechanism and permits the attainment of maximum balloon altitudes.

I have, in the drawings and specification, presented a detailed disclosure of the preferred embodiments of my invention, but it is to be understood that as the invention is susceptible of modifications, structural changes and various applications of use within the spirit and scope of the invention, I do not intend to limit the invention to the specific form disclosed but intend to cover all modifications, changes and alternative constructions and methods falling within the scope of the principles taught by my invention.

Now, therefore, I claim:

1. An altitude control for a balloon comprising a device for taking aloft a supply of ballast of a type capable of release in portions to decrease the gross weight of the balloon to cause it to rise, means associated with the ballast supply for releasing said portions of ballast, and an altitude control device associated with the ballast release means and operative in response to atmospheric pressure to cause intermittent operation of said ballast release means.

2. An altitude control for a balloon comprising a device for containing a quantity of ballast adapted for release to decrease the gross weight of a balloon to cause it to rise, ballast release means associated with the ballast containing device for continual release of small amounts of ballast upon actuation, and an altitude control device operatively associated with the ballast release means and responsive to pressure, said control device operative in response to a predetermined pressure to intermittently actuate said release means to cause intermittent release of quantities of ballast.

3. An altitude control for a balloon comprising a device for supporting a quantity of ballast from a balloon, an electrical release mechanism associated therewith and operable to cause release of small amounts of ballast when receiving an electrical signal, and an altitude control device operatively associated with the release mechanism and responsive to a predetermined atmospheric condition, said altitude control device sending an intermittent electrical signal to said release mechanism causing intermittent operation and intermittent release of ballast at said predetermined atmospheric condition.

4. An altitude control for a balloon comprising a device acting during operation to change the gross lift of a balloon in flight, means operatively associated with said device and responsive to a signal, said means placing said device in operation during the receipt of a signal, and an altitude control device connected to said means and operable in response to a varying condition to send a continuous series of intermittent signals to said means, the duration of the signals varying with the degree of said condition.

5. An altitude control for a balloon comprising a device for carrying a quantity of ballast aloft with a balloon, an apparatus connected to the carrying device for discharging increments of ballast to decrease the gross weight and cause the balloon to rise, and an altitude control device connected to the ballast discharging device and operable in response to a condition to cause said discharging apparatus to operate for intermittent periods of operation, said control device changing the length of the periods in correspondence to changes of the degree of said condition.

6. An altitude control for a balloon comprising a device operable to change the gross lift of a balloon in flight, apparatus connected to the lift changing device for causing said device to be in operation while an electrical signal is received, and an altitude control means connected to said electrical signal receiving apparatus and responsive to a change in atmospheric pressure to furnish an electrical signal to said apparatus, the period that said signal is furnished varying with said pressure.

7. An altitude control for a balloon to maintain it at a desired altitude comprising a device acting to increase the gross lift of a balloon when in operation, apparatus connected thereto for causing operation of said device when receiving a stimulus, and altitude control means responsive to the altitude of the balloon to intermittently furnish said stimulus to the apparatus when the balloon is below the desired altitude, the duration of the stimulus increasing proportionately with the distance of the balloon from the desired altitude.

8. An altitude control for a balloon to maintain it at a desired altitude comprising a device for increasing the gross lift of a balloon during flight, electrical means associated therewith for causing operation of said device, a conductor connected to complete a circuit to said electrical means when supplied with a current, a commutator having a current conducting element with a broader area and a narrower area constructed to engage said conductor to transmit current thereto, the gross lift of the balloon being increased while the brush engages the conducting area, and altitude responsive means operatively connected to the brush and arranged to move the position of the brush from said broader conducting area to said narrower area as the balloon ascends.

9. An altitude control device for a balloon comprising means for carrying ballast aloft with a balloon, electrically operated valve means operatively associated with the ballast carrying means for releasing ballast to decrease the gross weight of the balloon and increase the gross lift, a first and second brush spaced from each other and connected to supply electricity to operate said ballast release valve when a circuit is completed between them, a commutator rotating beneath the brushes and having a conducting segment carried to contact the brushes and complete the circuit between them, the segment being shaped to change the time of contact when the position of the brush is altered with respect to the commutator, and a pressure responsive device adapted to move the position of a brush relative to the commutator to decrease the time both brushes contact the cylinder as the balloon approaches a desired altitude thus decreasing the rate of ballast drop.

10. An altitude control for a balloon comprising a means for carrying an amount of ballast aloft with a balloon, an apparatus connected to the carrying means and discharging the ballast at a variable rate to decrease the gross weight and change the gross lift of the balloon to cause it to rise, and an altitude control device operable when the balloon drops below a predetermined altitude and responsive to changes in altitude, said control device operatively associated with said ballast discharging apparatus and adapted to change the speed of operation of the discharge apparatus, the control device causing said speed of operation and the consequent rate of ballast discharge to vary proportionally with the distance the balloon is below said predetermined altitude.

11. An altitude control for a balloon, means for carrying a quantity of ballast aloft with a balloon, an apparatus connected to said carrying means and adapted for discharging the ballast at varying rates to decrease the gross weight and cause the balloon to rise, and an altitude control device operable when the balloon descends below a predetermined altitude and operatively connected with said ballast discharge apparatus to discharge ballast when in operation, said control device also operable to cause the ballast discharge apparatus to operate at a decreasing rate in proportion to the distance of the balloon from said predetermined altitude to thereby reduce the distance the balloon will ascend past said altitude.

12. An altitude control for a balloon comprising means for carrying a supply of ballast aloft with a balloon, a device for releasing the ballast when operative, apparatus adapted to cause operations of said ballast release device when the balloon drops below a determined altitude, and condition responsive means operable to determine said altitude in response to predetermined conditions.

13. An altitude control for a balloon comprising means for carrying a quantity of ballast aloft with a balloon, a device operatively connected to the ballast carrying means for releasing said ballast when placed in operation, altitude responsive apparatus operatively connected to the ballast release device for causing operation of said ballast release device when the balloon drops below a predetermined altitude, and an electrical multi-position switch operatively connected to the ballast release device and changing switch positions in response to an electrical signal received from a remote control to selectively change the altitude at which the operation of the ballast release device will be initiated.

14. An altitude control for a balloon comprising means for carrying a provision of ballast aloft with a lighter-than-air balloon, a device operatively connected to the ballast carrying means for releasing said ballast when placed in operation, pressure responsive mechanism connected to cause operation of said ballast release device when the balloon drops below a predetermined altitude, and mechanism operatively connected to the ballast release device and responsive to a signal to change said predetermined altitude by altering the altitude at which the ballast release device will be made operative.

15. An altitude control device for a balloon comprising means for changing the gross lift of a balloon during the receipt of a first control signal, and a device connected to the lift changing means and initiating said first control signal and supplying it to the lift changing device, the length of said signal decreasing proportionately with the distance of the balloon from a predetermined desired altitude, said signal device furnishing a second signal which is recordable to indicate by its length the relative position of the balloon with respect to said predetermined altitude.

16. An altitude indicating device for a balloon comprising a device responsive to changes in altitude, means for initiating a signal the length of which may be recorded, and a device operatively connected to the signal initiating means for sending operating impulses of varying length for intermittently actuating said signal initiating means, said altitude responsive device being operatively connected to said impulse device so that the length of said impulses will be proportional to the distance the balloon is from a predetermined altitude.

17. The method of controlling the altitude of a balloon and maintaining it at a substantially constant altitude which comprises changing the gross lift of the balloon as it leaves said altitude and increasing the rate of change in proportion to the distance the balloon varies from said altitude.

18. The method of controlling the altitude of a balloon and maintaining it at a substantially constant predetermined altitude which comprises dropping ballast when the balloon descends below said predetermined altitude to decrease the gross weight and cause the balloon to rise, and gradually decreasing the rate of ballast drop in proportion to the position of the balloon relative to the predetermined altitude as the balloon rises and approaches said altitude to lessen the distance the balloon will rise past said altitude.

References Cited in the file of this patent

UNITED STATES PATENTS

| | | |
|---|---|---|
| 1,286,178 | Halsey | Nov. 26, 1918 |
| 1,793,989 | Barr | Feb. 24, 1931 |
| 2,341,351 | Barkley | Feb. 8, 1944 |
| 2,365,445 | Badowski | Dec. 19, 1944 |